(12) United States Patent
Zou et al.

(10) Patent No.: US 10,622,878 B2
(45) Date of Patent: Apr. 14, 2020

(54) POWER GENERATION DEVICE

(71) Applicant: WUHAN LINPTECH CO., LTD., Wuhan, Hubei (CN)

(72) Inventors: Xiaohua Zou, Hubei (CN); Xiaoke Cheng, Hubei (CN)

(73) Assignee: WUHAN LINPTECH CO., LTD., Wuhan (CN)

( * ) Notice: Subject to any disclaimer, the term of this patent is extended or adjusted under 35 U.S.C. 154(b) by 60 days.

(21) Appl. No.: 15/858,124

(22) Filed: Dec. 29, 2017

(65) Prior Publication Data

US 2018/0191232 A1 Jul. 5, 2018

(30) Foreign Application Priority Data

Dec. 31, 2016 (CN) .......................... 2016 1 1267608

(51) Int. Cl.
*H02K 35/02* (2006.01)
*H02K 1/14* (2006.01)
*H02K 7/18* (2006.01)
*H01F 41/02* (2006.01)

(52) U.S. Cl.
CPC ......... *H02K 35/02* (2013.01); *H01F 41/0233* (2013.01); *H02K 1/14* (2013.01); *H02K 7/1853* (2013.01); *H02K 7/1892* (2013.01)

(58) Field of Classification Search
CPC ...... H01F 41/0233; H02K 1/14; H02K 35/02; H02K 7/1853; H02K 7/1892; H01H 50/043; H01H 50/443; H01H 50/642
USPC ...................................... 310/216.001; 335/78
See application file for complete search history.

(56) References Cited

U.S. PATENT DOCUMENTS

| 4,713,638 A * | 12/1987 | Kamo ................ H01H 51/2227 335/234 |
| 4,730,176 A * | 3/1988 | Matsuo .............. H01H 51/2227 335/230 |
| 5,608,366 A * | 3/1997 | Sako .................... H01H 51/229 335/128 |
| 6,046,661 A * | 4/2000 | Reger .................... H01H 50/56 335/185 |
| 6,320,485 B1 * | 11/2001 | Gruner ................ H01H 50/546 335/132 |
| 6,359,537 B1 * | 3/2002 | Ichikawa ............... H01H 49/00 335/78 |
| 6,366,186 B1 * | 4/2002 | Hill ..................... H01H 50/005 257/421 |
| 6,426,689 B1 * | 7/2002 | Nakagawa ......... H01H 51/2272 335/78 |

(Continued)

*Primary Examiner* — Alex W Mok

(57) ABSTRACT

The invention provides a power generation device including a magnetic conduction member, an induction assembly, and a magnet assembly. The induction assembly includes a magnetic core and a coil wound around the magnetic core. A first end of the magnetic core is connected to the magnetic conduction member. The magnetic conduction member includes a first magnetic conduction sheet and a second magnetic conduction sheet. When a second end of the magnetic core is contacted by the second magnetic conduction sheet, a first magnetic circuit is formed, and a magnetic line of the magnetic core is along a first direction. When the second end of the magnetic core is contacted by the first magnetic conduction sheet, a second magnetic circuit is formed, and a magnetic line of the magnetic core is along a second direction opposite to the first direction.

19 Claims, 8 Drawing Sheets

(56) References Cited

U.S. PATENT DOCUMENTS

| | | | | |
|---|---|---|---|---|
| 9,478,379 B2* | 10/2016 | Li | ............ | H01H 51/22 |
| 2002/0089400 A1* | 7/2002 | Okita | ............ | H01F 29/146 |
| | | | | 335/229 |
| 2008/0180197 A1* | 7/2008 | Kubono | ............ | H01H 50/043 |
| | | | | 335/78 |
| 2010/0039195 A1* | 2/2010 | Morimura | ............ | H01H 51/2227 |
| | | | | 335/189 |
| 2010/0117769 A1* | 5/2010 | Kuo | ............ | H01H 50/026 |
| | | | | 335/78 |
| 2010/0225427 A1* | 9/2010 | Fujimoto | ............ | H01H 50/043 |
| | | | | 335/2 |
| 2010/0231333 A1* | 9/2010 | Shen | ............ | H01H 51/2281 |
| | | | | 335/179 |
| 2012/0237067 A1* | 9/2012 | Asnes | ............ | H04R 9/025 |
| | | | | 381/326 |
| 2013/0093561 A1* | 4/2013 | Moiseev | ............ | H01F 3/10 |
| | | | | 336/221 |
| 2014/0270297 A1* | 9/2014 | Gustafsson | ............ | H04R 25/606 |
| | | | | 381/326 |
| 2015/0213987 A1* | 7/2015 | Sasaki | ............ | H01H 51/2209 |
| | | | | 335/78 |

* cited by examiner

POWER GENERATION DEVICE

CROSS-REFERENCE TO RELATED APPLICATION

The present application claims priority to Chinese patent application No. 201611267608.6 filed on Dec. 31, 2016, the whole disclosure of which is incorporated herein by reference.

BACKGROUND OF THE INVENTION

Field of the Invention

This invention relates to power generation devices, and more particular, to a power generation device with a simple structure and a large power generation capacity.

Description of the Related Art

With the development of electronic technologies and more attentions paid to environmental protections, power generation devices are widely used to replace dry-cell batteries and wired power sources. However, most power generation devices are with a lower power generation capacity, which affects an application range of the power generation devices, so that, the power generation devices are always used in some apparatus with micro-power consumption requirements. Moreover, the power generation devices always have complicated structures and are inconvenient to assembly.

It is desirable to provide an invention, which can overcome the problems and limitations mentioned above.

SUMMARY OF THE INVENTION

The present invention is directed to a power generation device that substantially obviates one or more of the problems due to limitations and disadvantages of the related art.

In an aspect of the present invention, there is provided a power generation device comprising a magnetic conduction member, an induction assembly comprising a magnetic core, and a coil wound around the magnetic core. A first end of the magnetic core is connected to the magnetic conduction member. The magnet assembly comprises a magnet, a first magnetic conduction sheet, and a second magnetic conduction sheet opposite to the first magnetic conduction sheet. The first magnetic conduction sheet contacts a first magnetic pole of the magnet, and the second magnetic conduction sheet contacts a second magnetic pole of the magnet. A second end of the magnetic core is contacted by the first magnetic conduction sheet or the second magnetic conduction sheet. On condition that the second end of the magnetic core is contacted by the second magnetic conduction sheet, a first magnetic circuit is formed sequentially by the magnet, the first magnetic conduction sheet, the magnetic conduction member, the magnetic core, and the second magnetic conduction sheet. A magnetic line of the magnetic core is along a first direction. On condition that the second end of the magnetic core is contacted by the first magnetic conduction sheet, a second magnetic circuit is formed sequentially by the magnet, the first magnetic conduction sheet, the magnetic core, the magnetic conduction member, and the second magnetic conduction sheet. A magnetic line of the magnetic core is along a second direction opposite to the first direction.

In another aspect of the present invention, there is provided a power generating device comprising a driving assembly comprising a fixing member and a pair of mounting arms; a magnet assembly fixed in the fixing member; a magnetic conduction member pivotably sandwiched between the mounting arms; and an induction assembly attached to the magnetic conduction member. The magnet assembly comprises a magnet, a first magnetic conduction sheet, and a second magnetic conduction sheet opposite to the first magnetic conduction sheet. The first magnetic conduction sheet contacts a first magnetic pole of the magnet and the second magnetic conduction sheet contacts a second magnetic pole of the magnet. The induction assembly comprises a magnetic core and a coil wound around the magnetic core. A first end of the magnetic core is connected to the magnetic conduction member. The driving assembly is driven to pivot relative to the magnetic conduction member so that the magnet assembly is moved between a first position and a second position. In the first position, a second end of the magnetic core is contacted by the second magnetic conduction sheet, and a magnetic line of the magnetic core is along a first direction. In the second position, the second end of the magnetic core is contacted by the first magnetic conduction sheet, and a magnetic line of the magnetic core is along a second direction opposite to the first direction.

It is to be understood that both the foregoing general description and the following detailed description are exemplary and explanatory and are intended to provide further explanations of the invention as claimed.

BRIEF DESCRIPTION OF THE DRAWINGS

Implementations of the present technology will now be described, by way of example only, with reference to the attached drawings. It may be understood that these drawings are not necessarily drawn to scale, and in no way limit any changes in form and detail that may be made to the described embodiments by one skilled in the art without departing from the spirit and scope of the described embodiments.

DETAILED DESCRIPTION OF THE PREFERRED EMBODIMENTS

In order to make the purposes, technical solutions, and advantages of the present invention be clearer, the present invention will be further described in detail hereafter with reference to the accompanying drawings and embodiments. However, it will be understood by those of ordinary skill in the art that the embodiments described herein can be practiced without these specific details. In other instances, methods, procedures and plates have not been described in detail so as not to obscure the related relevant feature being described. Also, it should be understood that the embodiments described herein are only intended to illustrate but not to limit the present invention.

Several definitions that apply throughout this disclosure will be presented. The term "connected" is defined that the objects are permanently connected or releasably connected. The term "comprise", when utilized, means "include, but not necessarily limited to"; it specifically indicates open-ended inclusion or membership in a so-described combination, group, series and the like.

It should be noted that references to "an" or "one" embodiment in this disclosure are not necessarily to the same embodiment, and such references mean "at least one."

Figure 1:
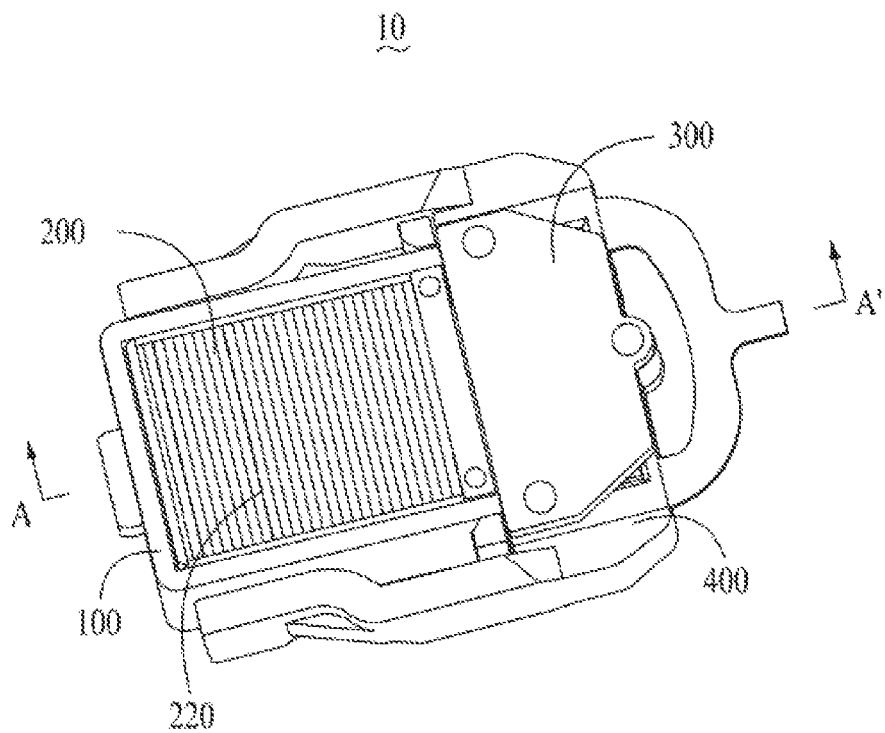
FIG. 1 is an assembled schematic view of a power generation device provided by a first embodiment of the present invention; wherein the power generation device comprises a magnetic conduction member, an induction assembly comprising a magnetic core and a bobbin, a magnet assembly, and a driving assembly.

FIG. 1 illustrates an assembled schematic view of a power generation device 10 provided by a first embodiment of the present invention. The power generation device 10 comprises a magnetic conduction member 100, an induction assembly 200, a magnet assembly 300, and a driving assembly 400. The induction assembly 200 is attached to the magnetic conduction member 100. The magnet assembly 300 is attached to the driving assembly 400. The driving assembly 400 is pivotably attached to the magnetic conduction member 100 to drive the magnet assembly 300 to repeatedly move from a first position to a second position relative to the induction assembly 200, so as to change a magnetic flux in the induction assembly 200. Thus, a power is generated by the induction assembly 200.

Figure 2:
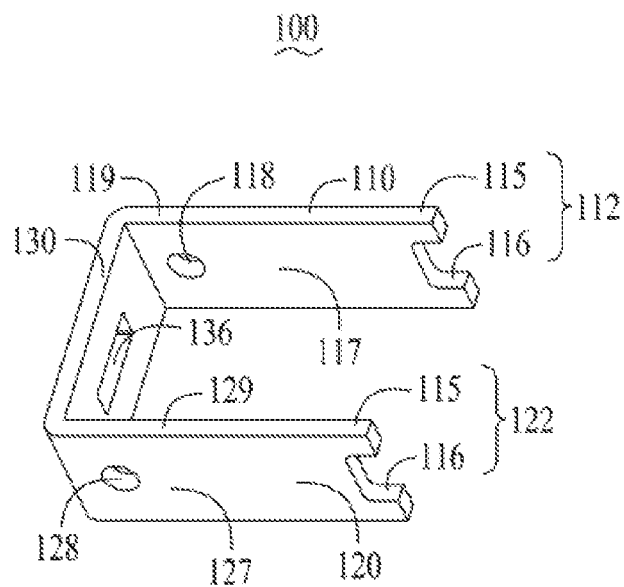
FIG. 2 is an isometric schematic view of the magnetic conduction member of FIG. 1.

FIG. 2 illustrates an isometric schematic view of the magnetic conduction member 100 provided by one embodiment of the present invention. The magnetic conduction member 100 is generally U-shaped and made of soft magnetic materials. The magnetic conduction member 100 comprises a first magnetic conduction plate 110, a second magnetic conduction plate 120 parallel to the first magnetic conduction plate 110, and a connection plate 130 connected to the first magnetic conduction plate 110 and the second magnetic conduction plate 120. The first magnetic conduction plate 110, the second magnetic conduction plate 120, and the connection plate 130 are generally rectangular. The first magnetic conduction plate 110 comprises a pair of sidewalls 117 acting as main magnetic conduction walls and a pair of end walls 119 acting as auxiliary magnetic conduction walls. An area of the sidewall 117 is larger than an area of the end wall 119. The second magnetic conduction plate 120 comprises a pair of sidewalls 127 acting as main magnetic conduction walls and a pair of end walls 129 acting as auxiliary magnetic conduction walls. An area of the sidewall 127 is larger than an area of the end wall 129. A pair of first clamping portions 112 is respectively formed at distal ends of the first magnetic conduction plate 110 and the second magnetic conduction plate 120. Each of the first clamping portion 112 is generally U-shaped and comprises a first bar 115 in an upper portion thereof and a second bar 116 in a lower portion thereof. The second bar 116 is parallelly spaced from the first bar 115 along a vertical direction. Lengths of the first bars 115 and the second bars 116 are same. A pair of mounting holes 118 is respectively defined in the first magnetic conduction plate 110 and the second magnetic conduction plate 120, near the connection plate 130. A rectangular opening 136 is defined in the connection plate 130.

Figure 3:
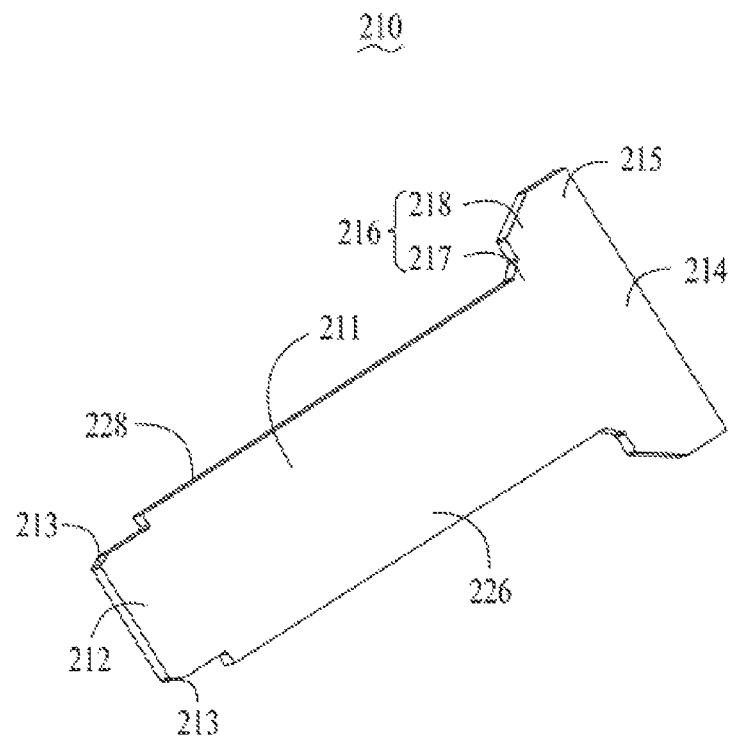
FIG. 3 is an isometric schematic view of the magnetic core of the induction assembly of FIG. 1.
Figure 4:
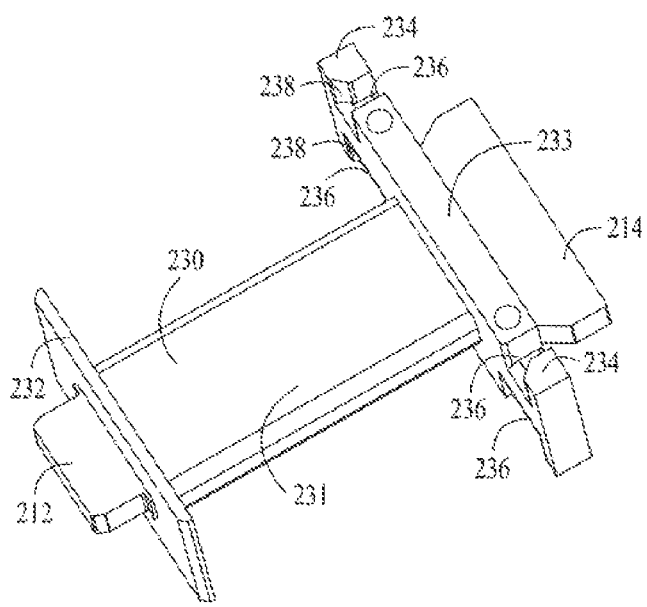
FIG. 4 is an isometric assembled schematic view of the magnetic core and the bobbin of the induction assembly of FIG. 1.

Referring to FIGS. 1, 3 and 4, in one embodiment, the induction assembly 200 comprises a magnetic core 210, a coil 220 wound around the magnetic core 210, and a bobbin 230. The bobbin 230 is attached to the magnetic conduction member 100, for receiving the magnetic core 210 therein.

FIG. 3 illustrates an isometric schematic view of the magnetic core provided by one embodiment of the present invention. The magnetic core 210 is generally T-shaped and comprises a main board 211. The main board 211 is generally rectangular. The main board 211 comprises a pair of sidewalls 226 acting as main magnetic conduction walls and a pair of end walls 228 acting as auxiliary magnetic conduction walls. An area of the sidewall 226 is greater than an area of the end wall 228. A fixing board 212 is formed at a first end of the main board 211 and a contact board 214 formed at a second end of the main board 211. The contact board 214 comprises a rectangular contact portion 215, and a connection portion 216 connected to the contact portion 215 and the main board 211.

The connection portion 216 comprises a plurality of trapezoids with a gradually increasing area along a direction from the main board 211 to the contact board 214. In one embodiment, the connection portion 216 comprises a first trapezoid 217 and a second trapezoid 218 along the direction from the main board 211 to the contact board 214. A length of a long base edge of the first trapezoid 217 is less than that of a short base edge of the second trapezoid 218. A height of the first trapezoid 217 is less than that of the second trapezoid 218. In other embodiments, the connection portion 216 may be omitted, and the shape of the connection portion 216 may be adjusted according to actual situations.

In one embodiment, the fixing board 212 is generally rectangular and narrower than the main board 211. A pair of guiding walls 213 is slantingly formed at two opposite sides of the distal end of the fixing board 212. The fixing board 212 extends through the opening 136 of the connection plate 130 to engage with a fixing portion of an external device (not shown). In other embodiments, sizes and shapes of the fixing board 212 can be adjusted according actual situations.

FIG. 4 illustrates an assembly schematic view of the magnetic core 210 and the bobbin 230 provided by one embodiment of the present invention. The bobbin 230 is capable of receiving the main board 211 of the magnetic core 210 therein. The bobbin 230 comprises a main body 231, a blocking piece 232 perpendicularly formed at a first end of the main body 231, and a mounting piece 233 perpendicularly formed at a second end of the main body 231. The coil 220 is wound around the main body 231 and sandwiched between the blocking piece 232 and the mounting piece 233. The main body 231 is a hollow frame and comprises a cavity (not shown) defined therein for receiving the main board 211 of the magnetic core 210 therein. A pair of second clamping portions 234 is respectively formed at two opposite ends of the mounting piece 233. Each of the second clamping portions 234 has an H-shaped configuration. Each of the second clamping portions 234 comprises a pair of cutouts 236 respectively defined in an upper portion thereof and a lower portion thereof. A pair of slanting guiding walls 238 is respectively formed at inner walls of each cutout 236 adjacent the main body 231, for guiding the first and second bars 115, 116 to enter the cutouts 236.

Figure 5:
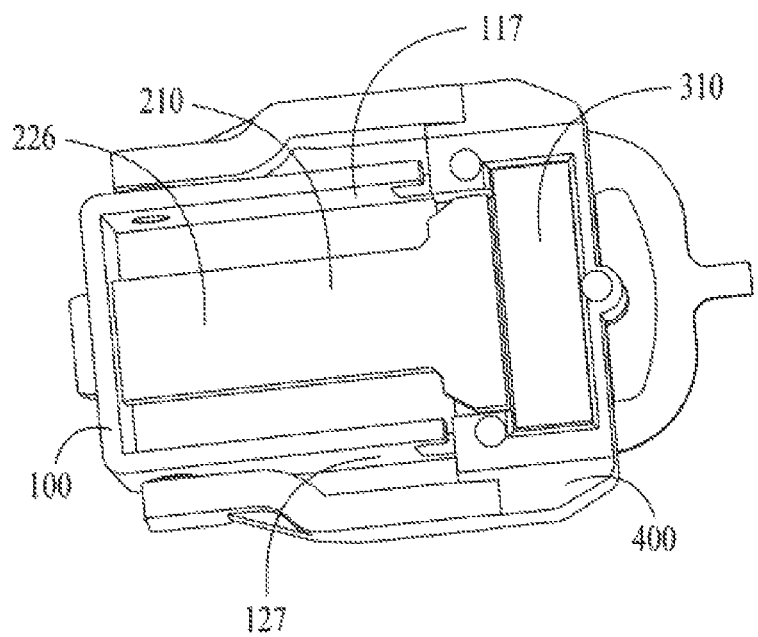
FIG. 5 is an assembled schematic view of the magnetic conduction member, the induction assembly, the magnet assembly, and the driving assembly of FIG. 1, but the bobbin is not shown.
Figure 6:
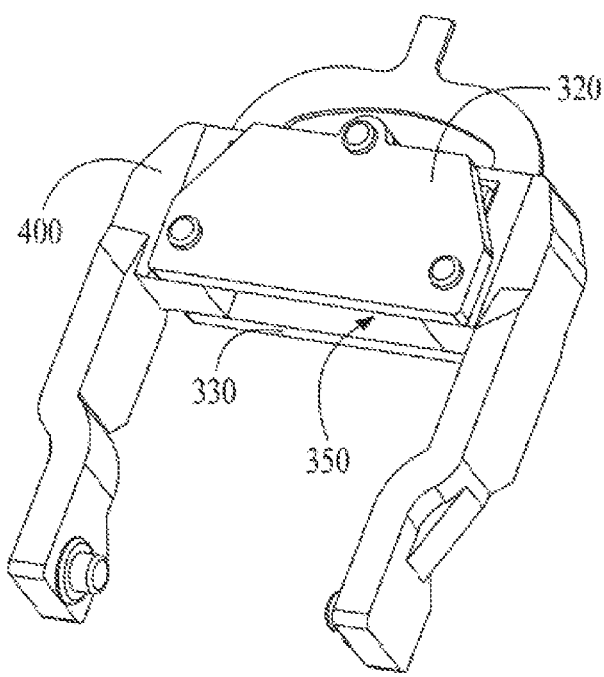
FIG. 6 is an assembled schematic view of the magnet assembly and the driving assembly of FIG. 1.

Referring to FIGS. 5 and 6, the magnet assembly 300 is attached to the driving assembly 400 and comprises a magnet 310, a first magnetic conduction sheet 320, and a second magnetic conduction sheet 330. The magnet 310 is permanent magnet. The magnet 310 is rectangular and comprises a first magnetic pole and a second magnetic pole respectively formed at two opposite ends thereof. The first magnetic conduction sheet 320 contacts the first magnetic pole of the magnet 310 and the second magnetic conduction sheet 330 contacts the second magnetic pole of the magnet 310. Each of the first magnetic conduction sheet 320 and the second magnetic conduction sheet 330 is larger than a cross-section of the magnet 310. The first magnetic conduction sheet 320 and the second magnetic conduction sheet 330 is made of soft magnetic materials.

Figure 7:
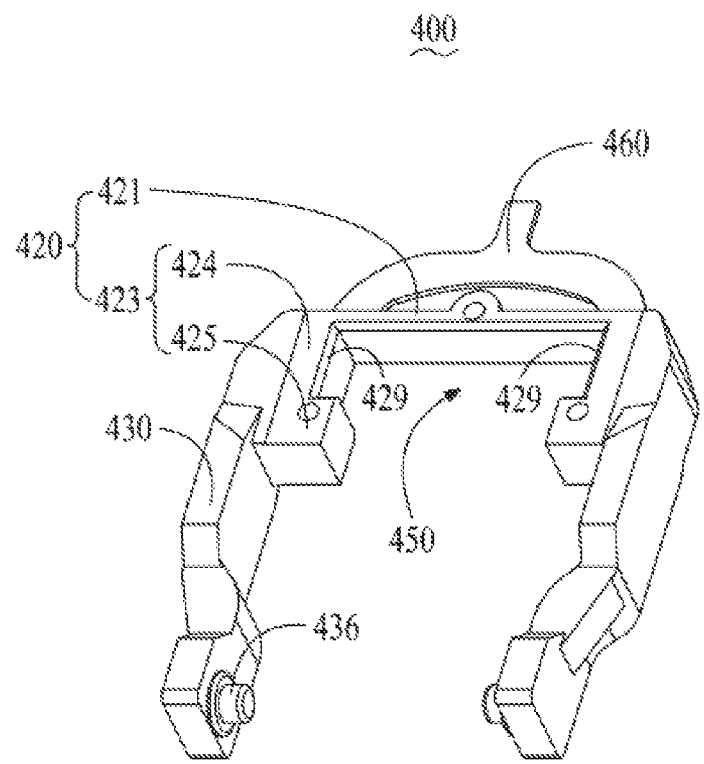
FIG. 7 is an isometric schematic view of the driving assembly of FIG. 1.

FIG. 7 illustrates an isometric schematic view of the driving assembly provided by one embodiment of the present invention. The driving assembly 400 is configured for mounting the magnet assembly 300 and the magnetic conduction member 100 thereon. The driving assembly 400 comprises a fixing member 420 for attaching the magnet assembly 300 thereon, and a pair of mounting arms 430 for pivotably mounting the magnetic conduction member 100 thereon, and a resilient member 460 for converting an external force to a driving force.

The fixing member 420 comprises a beam 421, and a pair of L-shaped fixing arms 423. The pair of L-shaped fixing arms 423 is respectively formed at opposite ends of the beam 42, toward each other. The beam 421 and the pair of L-shaped fixing arms 423 cooperative define a receiving space 450 for receiving the magnet 310 therein. Each the fixing arm 423 comprises a first portion 424 perpendicular to the beam 421, and a second portion 425 perpendicularly formed at an inner side of a distal end of the first portion 424. A slanting guiding walls 429 is respectively formed at an inner sides of each of the beam 421 and the fixing arms 423, for guiding the magnet 310 to enter the receiving space 450. A protrusion (not labeled) extends from an outer side of the beam 421. A fastening hole (not labeled) is defined in each of the protrusion and the second portions 425 of the fixing arms 423. Fasteners (not shown) engage in the fastening holes to respectively attach the first magnetic conduction sheet 320 and the second magnetic conduction sheet 330 to an upper portion of the fixing member 420 and a lower portion of the fixing member 420.

The mounting arms 430 are respectively formed at outer sides of the fixing arms 423 of the fixing member 420. The mounting arms 430 are a slightly curved at distal ends thereof and extend toward each other. A pair of mounting posts 436 is respectively formed at insides of the mounting arms 430. The mounting posts 436 are cylindrical.

The resilient member 460 is arcuate and connects an outer side of the beam of the fixing member 420 with two opposite ends thereof. The resilient member 460 may be bias springs, resilient tabs, or torsion springs.

In assembly, the coil 220 is tightly wound around an outer side of the main body 231 of the bobbin 230 and sandwiched between the blocking piece 232 and the mounting piece 233 of the bobbin 230. The main board 211 of the magnetic core 210 is received in the cavity of the main body 231 of the bobbin 230. The fixing board 212 extends through the main body 231 of bobbin 230 and extends out of the blocking piece 232 to engage in opening 136 of the connection plate 130 of the magnetic conduction member 100. The guiding walls 213 of the fixing board 212 guide the fixing board 212 smoothly extending through the cavity of the bobbin 230 and the opening 136 of the connection plate 130 of the magnetic conduction member 100. The contact board 214 of the magnetic core 210 extends out of the mounting piece 233. In one embodiment, the fixing board 212 is securely fixed to the connection plate 130 in a welded manner or an interferential snap-in manner.

The first clamping portions 112 of the magnetic conduction member 100 clamp with the second clamping portions 234 of the bobbin 230 of the induction assembly 200. The first bars 115 are respectively received in the cutouts 236 of the upper portion of the second clamping portions 234. The second bars 116 are respectively received in the cutouts 236 of the lower portion of the second clamping portions 234. The distal ends of the first bars 115 and the distal ends of the second bars 116 extend out of the mounting piece 233. The blocking piece 232 abuts against an inner side of the connection plate 130. Thus, the inducting assembly 200 is attached to the magnetic conduction assembly 100. The first magnetic conduction plate 110 and the second magnetic conduction plate 120 are perpendicular to the main board 211 of magnetic core 210. The sidewalls 117 of the first magnetic conduction plate 110 and the sidewalls 127 of the second magnetic conduction plate 120 are perpendicular to the sidewalls 226 of the magnetic core 210.

The magnet 310 is received in the receiving space 450 and retained by the fixing member 420 of the driving assembly 400. The first magnetic conduction sheet 320 and the second magnetic conduction sheet 330 are respectively attached to the upper portion and the lower portion of the fixing member 420. The first magnetic conduction sheet 320 and the second magnetic conduction sheet 330 respectively contact the first magnetic pole and the second magnetic pole of the magnet 310. Thus, the magnet assembly 300 is attached to the driving assembly 400. A receiving space 350 is further defined by the first magnetic conduction sheet 320, the second magnetic conduction sheet 330, the second portions 425 of fixing member 420, for receiving the contact board 214 of the magnetic core 210 therein. The mounting posts 436 are pivotably received in the mounting holes 118 of the magnetic conduction member 100 so that the driving assembly 400 is pivotably attached to the magnetic conduction assembly 100. The distal ends of the first bars 115 and the distal ends of the second bars 116 face the magnet assembly 300. The contact board 214 of the induction assembly 200 is spacedly sandwiched between the first magnetic conduction sheet 320 and the second magnetic conduction sheet 330. The contact board 214 is received in the receiving space 350.

An operation principle of the power generation device 10 of the present invention will be described below.

In one embodiment, the first magnetic pole of the magnet 310 is S pole and the second magnetic pole of the magnet 310 is N pole. It can be understood the first magnetic pole of the magnet 310 can be N pole and the second magnetic pole of the magnet 310 is S pole in the other embodiments.

Figure 8:
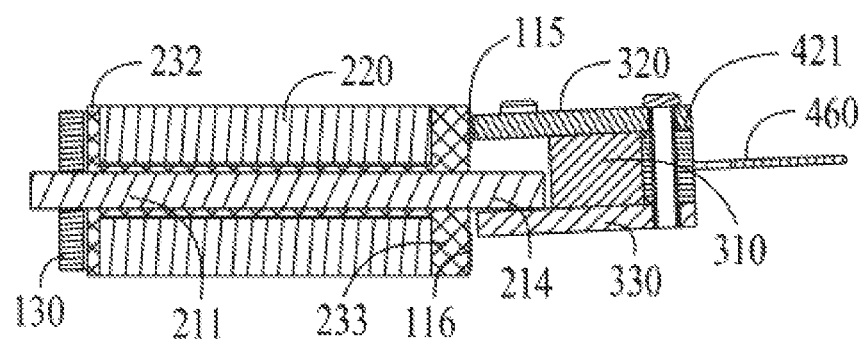
FIG. 8 is a cross-sectional schematic view taken along a line of A-A' of FIG. 1, wherein the magnet assembly is in a first position.

Referring to FIG. 8, when there is no external force applied to the resilient member 460, the magnet assembly 300 is in a first position. In the first position, the second magnetic conduction sheet 330 contacts the contact board 214 of the induction assembly 200, the first magnetic conduction sheet 320 contacts the distal ends of the first bars 115 of the magnetic conduction member 100 end to end, or the first magnetic conduction sheet 320 approaches the first bars 115 end to end with a narrow gap along a horizontal direction.

Figure 9:
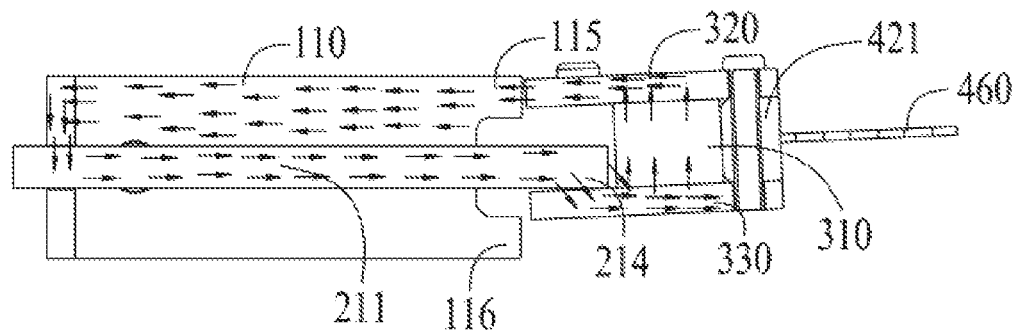
FIG. 9 is a schematic view of a first magnetic circuit formed when the magnet assembly of FIG. 1 is in the first position.

Referring to FIG. 9, a first magnetic circuit is sequentially defined in an upper portion of the power generation device 10 by the magnet 310, the first magnetic conduction sheet 320, the first bars 115, the first magnetic conduction plate 110, the connection plate 130, the magnetic core 210, and the second magnetic conduction sheet 330. The first magnetic circuit is clockwise.

Figure 10:
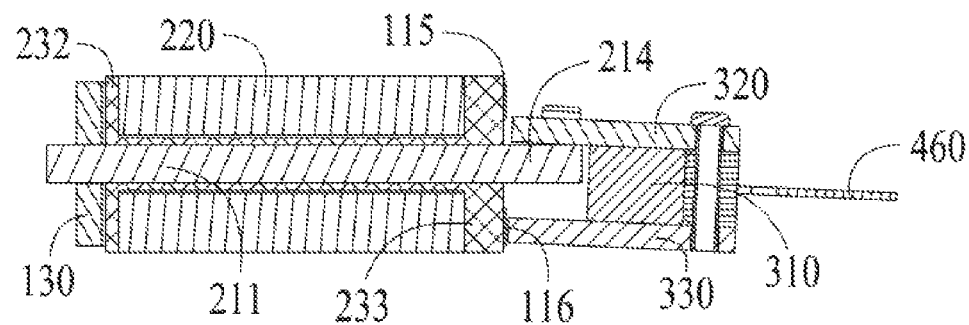
FIG. 10 is a cross-sectional schematic view taken along a line of A-A' of FIG. 1, wherein the magnet assembly is in a second position.

Referring to FIG. 10, when there is an external force applied to the resilient member 460 and the external force is greater than an attraction between the second magnetic conduction sheet 330 and the contact board 214 of the magnetic core 210, the driving assembly 400 is pivoted about the mounting posts 436 to move the magnet assembly 300 to a second position. In the second position, the first magnetic conduction sheet 320 contacts the contact board 214 of the induction assembly 200, the second magnetic conduction sheet 330 contacts the second bars 116 of the magnetic conduction member 100 end to end, or the second magnetic conduction sheet 330 approaches the second bars 116 end to end with a narrow gap along a horizontal direction.

Figure 11:
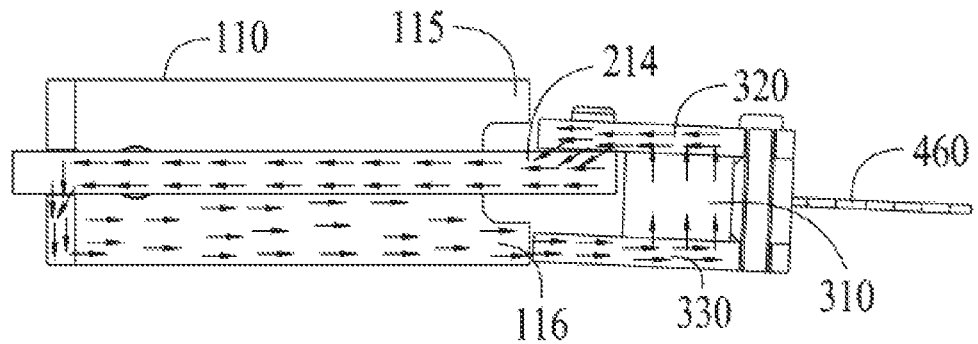
FIG. 11 is a schematic view of a second magnetic circuit formed when the magnet assembly of FIG. 1 is in the second position.

Referring to FIG. 11, a second magnetic circuit is defined in a lower portion of the power generation device 10 by the magnet 310, the first magnetic conduction sheet 320, the magnetic core 210, the third magnetic plate 130, the first magnetic plate 110, the second magnetic plate 120, the second bars 116, and the second magnetic conduction sheet 330. The second magnetic circuit is counterclockwise.

When the magnet assembly 300 is moved from the first position to the second position, a direction of the magnetic force line of the magnetic core 210 is changed 180 degrees. That is, a magnetic flux of the magnetic core 210 has changed. Due to the magnetic core 210 with a great number of coil turns, a greater area of a cross-section, and a greater magnetic density, when the magnet assembly 300 is moved from the first position to the second position, a magnetic flux in the coil 220 changes greatly, and a great electromotive force is produced. That is, the power generation device 10 has a larger power generating capacity.

When the magnet assembly 300 is moved from the first position to the second position, the induction assembly 200 generates a power once. In one embodiment, a moving direction of the magnet assembly 300 is substantially perpendicular to the main board 214 of the magnetic core 210.

When there is no external force applied to the resilient member 460, the resilient member 460 rebounds, a driving force is generate by the resilient member 460 and applied to the magnet assembly 300. When the driving force is greater than the attraction between the first magnetic conduction sheet 320 and the contact board 214 of the magnet magnetic core 210, the driving assembly 400 is pivoted about the mounting posts 436 to move the magnet assembly 300 from the second position to the first position. The direction of the magnetic force line of the magnetic core 210 is changed again, the magnetic flux of the magnetic core 210 is changed correspondingly, and the power generation device 10 generates a power again.

Therefore, it can be understood that when external forces are applied to the elastic member 460, the power generation device 10 generates the power twice. In addition, when the external forces drive the magnet assembly 300 through the driving assembly 400, it is only necessary to overcome the attraction between the first magnetic conduction sheet 320 and the contact board 214, or the attraction between the second magnetic conduction sheet 330 and the contact board 214. Thus, the external force applied to the resilient member 460 is greatly reduced. Thus, user experiences are improved.

In one embodiment, a distance between the mounting hole 118 and the connection plate 130 is less than the distance between the mounting hole 118 and the distal end of the first bar 115. In this way, the first magnetic conduction sheet 320 and the second magnetic conduction sheet 330 could more tightly contact the contact board 214 of the induction assembly 200 to facilitate the magnetic lines passing therethrough, which aids to increasing power generation.

In one embodiment, the magnet 310 is rectangular. A length of the magnet 310 ranges from 10 millimeters to 13 millimeters, a width of the magnet 310 ranges from 2.5 millimeters to 3.8 millimeters, a height of the magnet 310 ranges from 2.5 millimeters to 3.8 millimeters. The material of the magnetic conduction member 100, the magnetic core 210, the first magnetic conduction sheet 320 and the second magnetic conduction sheet 330 is a ferromagnetic nickel-iron alloy or pure iron treated by thermomagnetic treatment. In this way, the magnetic permeability of the magnetic conduction member 100, the magnetic core 210, the first magnetic conduction sheet 320 and the second magnetic conduction sheet 330 is increased, and the magnetic flux leakage is reduced and the power generation is increased.

In one embodiment, the bobbin 230 is sleeved on the main board 211 of the magnetic core 210 by integral injection molding so that the main body 231 of the bobbin 230 is made thinner, to facilitate winding more coils 220 on the bobbin 230 and further increase the power generation.

In one embodiment, the first magnetic conduction sheet 320 and the second magnetic conduction sheet 330 respectively contact the first magnetic pole and the second magnetic pole of the magnet 310. A contact area between the magnet 310 and the contact board 214 of the magnetic core 210 is increased and a magnetic induction of the magnetic core 210 is enhanced, a directly collision between the contact board 214 of the magnetic core 210 and the magnet 310 is prevented from breaking the magnet 310.

In one embodiment, the magnetic core 210 is fixed to the connection plate 130, with the sidewalls 226 of the magnetic core 210 is perpendicular to the sidewalls 117 of the first magnetic conduction plate 110 and the sidewalls 127 of the second magnetic conduction plate 120. Thus, the induction assembly 200 has a larger cross-sectional area.

In one embodiment, the first magnetic conduction sheet 320 and the second magnetic conduction sheet 330 are configured to contact the magnet 310 to increase a contact area between the contact board 214 of the magnetic core 210 and the magnet assembly 300, which leads an enhanced magnetic flux density. Thus, when the magnet assembly 300 is moved between the first position and the second position, the magnetic flux in the coil 220 changes greatly, so that the power generation device 10 is capable of generating a larger amount of electric power.

Additionally, the power generation device 10 has the advantages of a simple structure.

Figure 12:
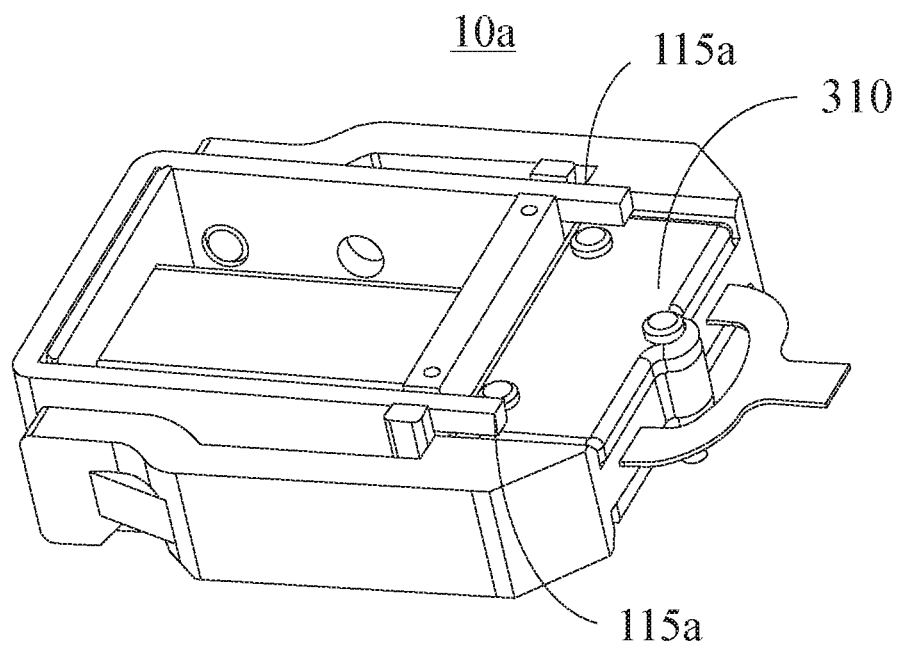
FIG. 12 is an assembled schematic view of a power generation device provided by a second embodiment of the present invention, without showing a coil.

FIG. 12 illustrates an assembled schematic view of a power generation device 10a provided by a second embodiment of the present invention. The second embodiment is similar to the first embodiment. However, in the second embodiment, the first bars 115a and the second bars 116a are with longer length. The first bars 115a and the second bars 116a extend out of the mounting piece 233. The distal ends of the first bars 115a extend over the first magnetic conduction sheet 320 and the distal ends of the second bars 116a extend over the second magnetic conduction sheet 330.

Figure 13:
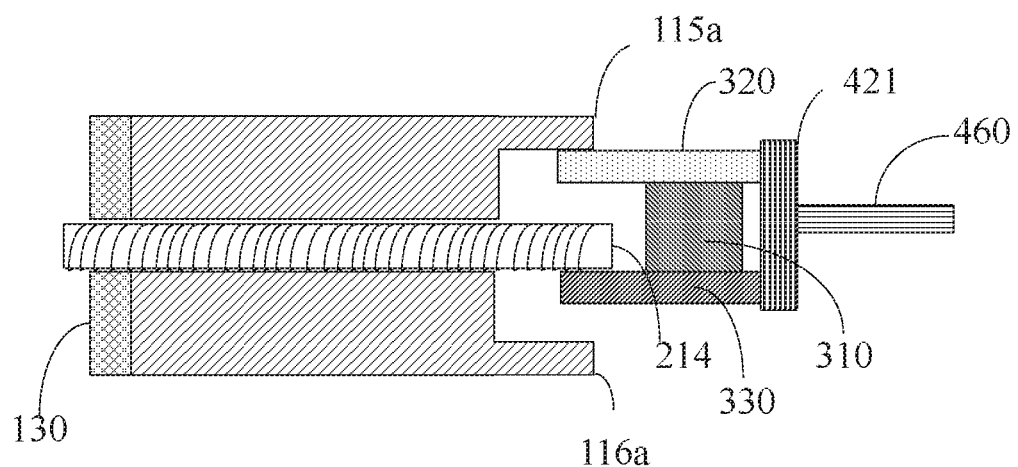
FIG. 13 is a cross-sectional schematic view of the power generation device of FIG. 12, wherein the magnet assembly is in a first position.
Figure 14:
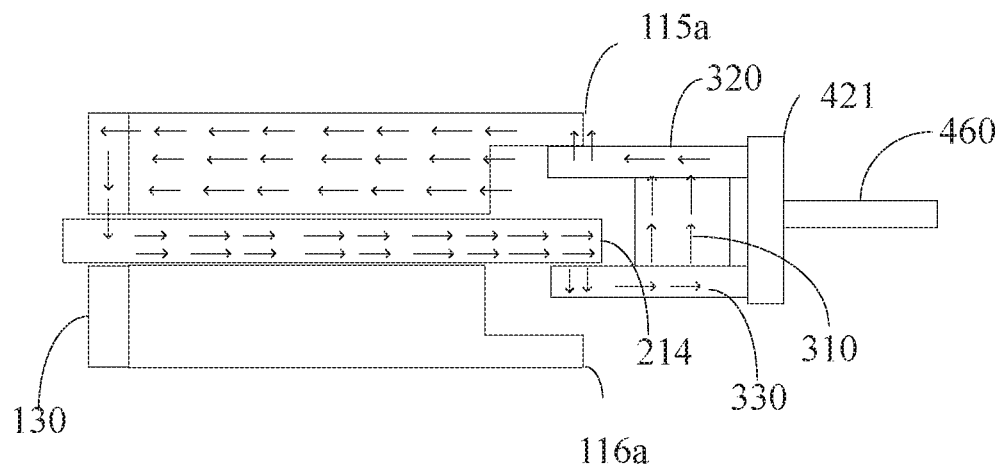
FIG. 14 is a schematic view of a first magnetic circuit formed when the magnet assembly of FIG. 12 is in the first position.

Referring to FIGS. 13 and 14, when there is no external force applied to the resilient member 460, the magnet assembly 300 is in a first position. In the first position, the second magnetic conduction sheet 330 contacts the contact board 214 of the magnetic core 210. The first magnetic conduction sheet 320 contacts the first bars 115a side by side, or the first magnetic conduction sheet 320 approaches the first bars 115a side by side with a narrow gap along a vertical direction. A first magnetic circuit is sequentially defined in an upper portion of the power generation device 10a by the magnet 310, the first magnetic conduction sheet 320, the first bars 115a, the first magnetic conduction plate 110, the connection plate 130, the magnetic core 210, and the second magnetic conduction sheet 330. The first magnetic circuit is clockwise.

Figure 15:
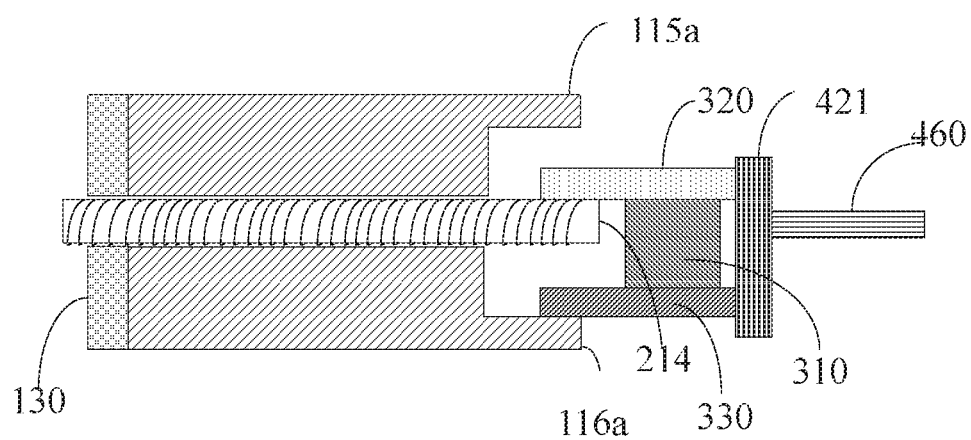
FIG. 15 is a cross-sectional schematic view of the power generation device of FIG. 12, wherein the magnet assembly is in a second position.
Figure 16:
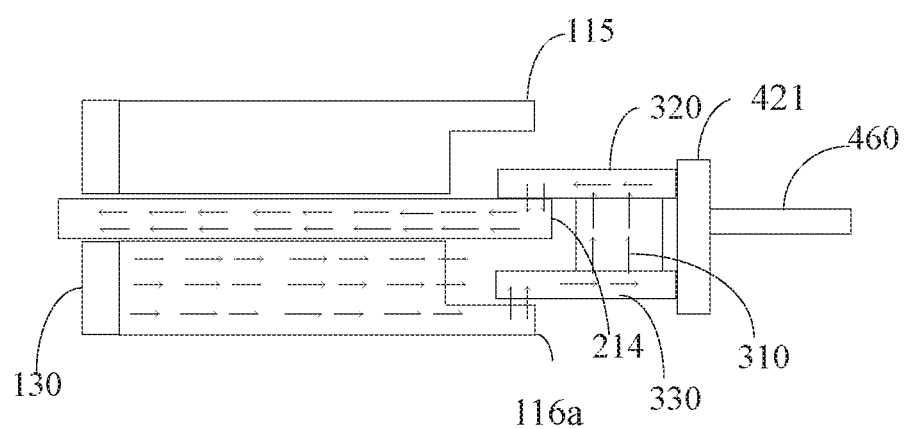
FIG. 16 is a schematic view of a second magnetic circuit formed when the magnet assembly of FIG. 12 is in the second position.

Referring to FIG. 15 and FIG. 16, when there is an external force applied to the resilient member 460, the resilient member 460 is deformed and a driving force provided by the driving assembly 400 exerts on the magnet assembly 300. When the driving force is greater than the attraction between the second magnetic conduction sheet 330 and the contact board 214 of the magnetic core 210, the driving assembly 400 is pivoted about the pivoting posts 436 to drive the magnet assembly 300 to a second position. In the second position, the first magnetic conduction sheet 320 contacts the contact board 214 of the magnetic core 210. The second magnetic conduction sheet 320 contacts the second bars 116a side by side, or the second magnetic conduction sheet 330 approaches the second bars 116a side by side with a narrow gap along a vertical direction. A second magnetic circuit is sequentially defined in a lower portion of the power generation device 10a by the magnet 310, the first magnetic conduction sheet 320, the magnetic core 210, the third magnetic plate 130, the first magnetic plate 110, the second magnetic plate 120, the second bars 116a, and the second magnetic conduction sheet 330. The second magnetic circuit is counterclockwise.

In the second embodiment, the first bars 115a and the second bars 116a are with longer length. A contact area between the first bars 115a and the first magnetic conduction sheet 320 in the second embodiment is larger than a contact area between the first bars 115 and the first magnetic conduction sheet 320 in the first embodiment. A contact area between the second bars 116a and the first magnetic conduction sheet 320 in the second embodiment is larger than a contact area between the second bars 116 and the second magnetic conduction sheet 330 in the first embodiment. The power generation device 10a in the second embodiment has advantages of a short flux line stroke, a better magnetic permeability, more obvious magnetic effect.

It will be apparent to those skilled in the art that various modification and variations can be made in the multicolor illumination device and related method of the present invention without departing from the spirit or scope of the invention. Thus, it is intended that the present invention cover modifications and variations that come within the scope of the appended claims and their equivalents.

What is claimed is:

1. A power generation device (10, 10a), comprising:
   a magnetic conduction member (100);
   an induction assembly (200) comprising a magnetic core (210) and a coil (220) wound around the magnetic core (210), a first end of the magnetic core (210) connected to the magnetic conduction member (100); and
   a magnet assembly (300) comprising a magnet (310), a first magnetic conduction sheet (320), and a second magnetic conduction sheet (330) opposite to the first magnetic conduction sheet (320), the first magnetic conduction sheet (320) contacting a first magnetic pole of the magnet (310), and the second magnetic conduction sheet (330) contacting a second magnetic pole of the magnet (310);
   wherein a second end of the magnetic core (210) is contacted by the first magnetic conduction sheet (320) or the second magnetic conduction sheet (330);
   wherein on condition that the second end of the magnetic core (210) is contacted by the second magnetic conduction sheet (330), a first magnetic circuit is formed sequentially by the magnet (310), the first magnetic conduction sheet (320), the magnetic conduction member (100), the magnetic core (210), and the second magnetic conduction sheet (330), and a magnetic line of the magnetic core (210) is along a first direction;
   wherein on condition that the second end of the magnetic core (210) is contacted by the first magnetic conduction sheet (320), a second magnetic circuit is formed sequentially by the magnet (310), the first magnetic conduction sheet (320), the magnetic core (210), the magnetic conduction member (100), and the second magnetic conduction sheet (330), and a magnetic line of the magnetic core (210) is along a second direction opposite to the first direction; and
   wherein the magnetic conduction member (100) comprises a first magnetic conduction plate (110), and a second magnetic conduction plate (120) opposite to the first magnetic conduction plate (110), a pair of first clamping portions (112, 122) is formed at distal ends of the first magnetic conduction plate (110) and the second magnetic conduction plate (120), each of the first clamping portions (112, 122) comprises a first bar (115, 115a) and a second bar (116, 116a) spaced from the first bar (115, 115a).

2. The power generation device (10, 10a) of claim 1, further comprising a driving assembly (400), wherein the magnetic conduction member (100), the induction assembly (200), and the magnet assembly (300) are attached to the driving assembly (400), and the driving assembly (400) is configured to drive the first magnetic conduction sheet (320) or the second magnetic conduction sheet (330) to contact the second end of the magnetic core (210);
   wherein on condition that the second magnetic conduction sheet (330) is driven to contact the second end of the magnetic core (210), the first bars (115, 115a) of the first clamping portions (112, 122) contact the first magnetic conduction sheet (320); and
   wherein on condition that the first magnetic conduction sheet (320) is driven to contact the second end of the magnetic core (210), the second bars (116, 116a) of the first clamping portions (112, 122) contact the second magnetic conduction sheet (330).

3. The power generation device (10, 10a) of claim 2, wherein the driving assembly (400) comprises a pair of mounting posts (436); a pair of mounting holes (118) is respectively defined in first magnetic conduction plate (110) and the second magnetic conduction plate (120), and is configured for respectively receiving the mounting posts (436) therein to movably attach to the driving assembly (400) to the magnetic conduction member (100).

4. The power generation device (10, 10a) of claim 3, wherein the mounting posts (436) are cylindrical, the mounting posts (436) are pivotably received in the mounting holes (118); the driving assembly (400) is pivoted about the mounting holes (118) when the external force applied to the driving assembly (400), and the first magnetic conduction sheet (320) or the second magnetic conduction sheet (330) is driven to contact the second end of the magnetic core (210).

5. The power generation device (10, 10a) of claim 3, wherein the magnetic conduction member (100) further comprises a connection plate (130) connecting the first magnetic conduction plate (110) and the second magnetic conduction plate (120); and a distance between the mounting hole (118) and the connection plate (130) is less than a distance between the mounting hole (118) and the distal end of the first bar (115).

6. The power generation device (10, 10a) of claim 2, wherein the driving assembly (400) comprises a fixing member (420) configured to attach the magnet assembly (300) thereto, and a pair of mounting arms (430) configured to pivotably attach the magnetic conduction member (100) thereon.

7. The power generation device (10, 10a) of claim 6, wherein the fixing member (420) comprises a beam (421), and a pair of L-shaped fixing arms (423) oppositely formed at two opposite ends of the beam (421), the beam (421) and the pair of L-shaped fixing arms (423) cooperative define a receiving space (450) for receiving the magnet (310) therein, the first magnetic conduction sheet (320) and the second magnetic conduction sheet (330) are respectively attached to an upper portion and a lower portion of the fixing member (420).

8. The power generation device (10, 10a) of claim 2, wherein the driving assembly (400) comprises a resilient member (460) configured to convert an external force to a driving force to drive the first magnetic conduction sheet (320) and the second magnetic conduction sheet (330).

9. The power generation device (10, 10a) of claim 1, wherein the magnetic core (210) is generally T-shaped and comprises a main board (211), and a fixing board (212) is formed at a first end of the main board (211) and a contact board (214) formed at a second end of the main board (211), the fixing board (212) is attached to the magnetic conduction member (100), the contact board (214) is contacted by the first magnetic conduction sheet (320) or the second magnetic conduction sheet (330).

10. The power generation device (10, 10a) of claim 9, wherein the first magnetic conduction plate (110) and the second magnetic conduction plate (120) are perpendicular to the main board (211) of magnetic core (210).

11. The power generation device (10, 10a) of claim 1, wherein on condition that the second end of the magnetic core (210) is contacted by the second magnetic conduction sheet (330), the first bars (115) contacts the first magnetic conduction sheet (320) end to end; and on condition that the second end of the magnetic core (210) is contacted by the first magnetic conduction sheet (320), the second bars (116) contacts the second magnetic conduction sheet (330) end to end.

12. The power generation device (10, 10a) of claim 1, wherein on condition that the second end of the magnetic core (210) is contacted by the second magnetic conduction sheet (330), the first bars (115a) contacts the first magnetic conduction sheet (320) side by side; and on condition that the second end of the magnetic core (210) is contacted by the first magnetic conduction sheet (320), the second bars (116a) contacts the second magnetic conduction sheet (330) side by side.

13. The power generation device (10, 10a) of claim 1, wherein the magnetic conduction member (100) further comprises a connection plate (130) configured for connecting the first magnetic conduction plate (110) and the second magnetic conduction plate (120), an opening (136) is defined in the connection plate (130) for receiving the first end of the magnetic core (210) therein.

14. The power generation device (10, 10a) of claim 1, wherein the induction assembly (200) further comprising a bobbin (230) sleeved on the magnetic core (210), the bobbin (230) comprises a main body (231), a blocking piece (232) and a mounting piece (233) perpendicularly formed at two opposite ends of the main body (231); and a pair of second clamping portions (234) is formed at two opposite ends of the mounting piece (233) for engaging with the first clamping portion (112, 122) of the magnetic conduction member (100).

15. The power generation device (10, 10a) of claim 1, wherein the magnet (310) is rectangular, a length of the magnet (310) ranges from 10 millimeters to 13 millimeters, a width of the magnet (310) ranges from 2.5 millimeters to 3.8 millimeters, and a height of the magnet (310) ranges from 2.5 millimeters to 3.8 millimeters.

16. The power generation device (10, 10a) of claim 1, wherein each of the first magnetic conduction sheet (320) and the second magnetic conduction sheet (330) is larger than an area of a cross-section of the magnet (310).

17. The power generation device (10, 10a) of claim 1, wherein a material of the magnetic conduction member (100), the first magnetic conduction sheet (320) and the second magnetic conduction sheet (330) is iron-nickel alloys or pure irons treated by thermomagnetic treatment.

18. A power generation device (10, 10a), comprising:
a driving assembly (400) comprising a fixing member (420) and a pair of mounting arms (430);
a magnet assembly (300) fixed in the fixing member (420) and comprising a magnet (310), a first magnetic conduction sheet (320), and a second magnetic conduction sheet (330) opposite to the first magnetic conduction sheet (320), the first magnetic conduction sheet (320) contacting a first magnetic pole of the magnet (310), the second magnetic conduction sheet (330) contacting a second magnetic pole of the magnet (310);
a magnetic conduction member (100) pivotably sandwiched between the mounting arms (430); and
an induction assembly (200) attached to the magnetic conduction member (100) and comprising a magnetic core (210) and a coil (220) wound around the magnetic core (210), and a first end of the magnetic core (210) connected to the magnetic conduction member (100);
wherein the driving assembly (400) is driven to pivot relative to the magnetic conduction member (100) so that the magnet assembly (300) is repeatedly moved between a first position and a second position; in the first position, a second end of the magnetic core (210) is contacted by the second magnetic conduction sheet (330), and a magnetic line of the magnetic core (210) is along a first direction; in the second position, the second end of the magnetic core (210) is contacted by the first magnetic conduction sheet (320), and a magnetic line of the magnetic core (210) is along a second direction opposite to the first direction.

19. The power generation device (10, 10*a*) of claim 18, wherein the driving assembly (400) comprises a resilient member (460) configured to convert an external force to a driving force to drive the magnet assembly (300).

* * * * *